US008820161B2

(12) United States Patent
Cazzaniga et al.

(10) Patent No.: US 8,820,161 B2
(45) Date of Patent: *Sep. 2, 2014

(54) MICROELECTROMECHANICAL Z-AXIS DETECTION STRUCTURE WITH LOW THERMAL DRIFTS

(71) Applicant: STMicroelectronics S.r.l., Agrate Brianza (IT)

(72) Inventors: Gabriele Cazzaniga, Rosate (IT); Luca Coronato, Corsico (IT); Barbara Simoni, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,170

(22) Filed: May 6, 2013

(65) Prior Publication Data

US 2013/0239686 A1   Sep. 19, 2013

Related U.S. Application Data

(63) Continuation of application No. 12/846,500, filed on Jul. 29, 2010, now Pat. No. 8,434,364.

(30) Foreign Application Priority Data

Jul. 31, 2009   (IT) .................................. TO09A0597

(51) Int. Cl.
*G01P 15/125* (2006.01)
*G01P 15/02* (2013.01)
*G01C 19/5755* (2012.01)
*G01C 19/5769* (2012.01)
*G01C 19/5712* (2012.01)

(52) U.S. Cl.
CPC ............... *G01P 15/125* (2013.01); *G01P 15/02* (2013.01); *G01C 19/5755* (2013.01); *G01C 19/5769* (2013.01); *G01C 19/5712* (2013.01)
USPC ...................................... 73/514.32; 73/514.38

(58) Field of Classification Search
USPC ............... 73/514.32, 514.36, 514.38, 514.29, 73/514.18
See application file for complete search history.

(56) References Cited

U.S. PATENT DOCUMENTS

| 5,974,895 A | 11/1999 | Steger et al. |
|---|---|---|
| 6,923,062 B2 | 8/2005 | Franz et al. |
| 7,293,460 B2 | 11/2007 | Zarabadi et al. |

(Continued)

FOREIGN PATENT DOCUMENTS

| CN | 101231303 A | 7/2008 |
|---|---|---|
| DE | 10053309 A1 | 5/2002 |

(Continued)

*Primary Examiner* — Helen Kwok
(74) *Attorney, Agent, or Firm* — Seed IP Law Group PLLC

(57) ABSTRACT

A MEMS detection structure is provided with: a substrate having a top surface, on which a first fixed-electrode arrangement is set; a sensing mass, extending in a plane and suspended above the substrate and above the first fixed-electrode arrangement at a separation distance; and connection elastic elements that support the sensing mass so that it is free to rotate out of the plane about an axis of rotation, modifying the separation distance, as a function of a quantity to be detected along an axis orthogonal to the plane. The MEMS detection structure also includes: a coupling mass, suspended above the substrate and connected to the sensing mass via the connection elastic elements; and an anchoring arrangement, which anchors the coupling mass to the substrate with a first point of constraint, set at a distance from the axis of rotation and in a position corresponding to the first fixed-electrode arrangement.

23 Claims, 7 Drawing Sheets

(56) References Cited

U.S. PATENT DOCUMENTS

| | | |
|---|---|---|
| 7,487,661 B2 | 2/2009 | Ueda et al. |
| 8,434,364 B2 * | 5/2013 | Cazzaniga et al. ......... 73/514.32 |
| 2007/0220973 A1 | 9/2007 | Acar |
| 2008/0110260 A1 | 5/2008 | Konno et al. |
| 2010/0107763 A1 | 5/2010 | Lin et al. |

FOREIGN PATENT DOCUMENTS

| | | |
|---|---|---|
| DE | 102007048882 A1 | 4/2009 |
| WO | 03016919 A1 | 2/2003 |

* cited by examiner

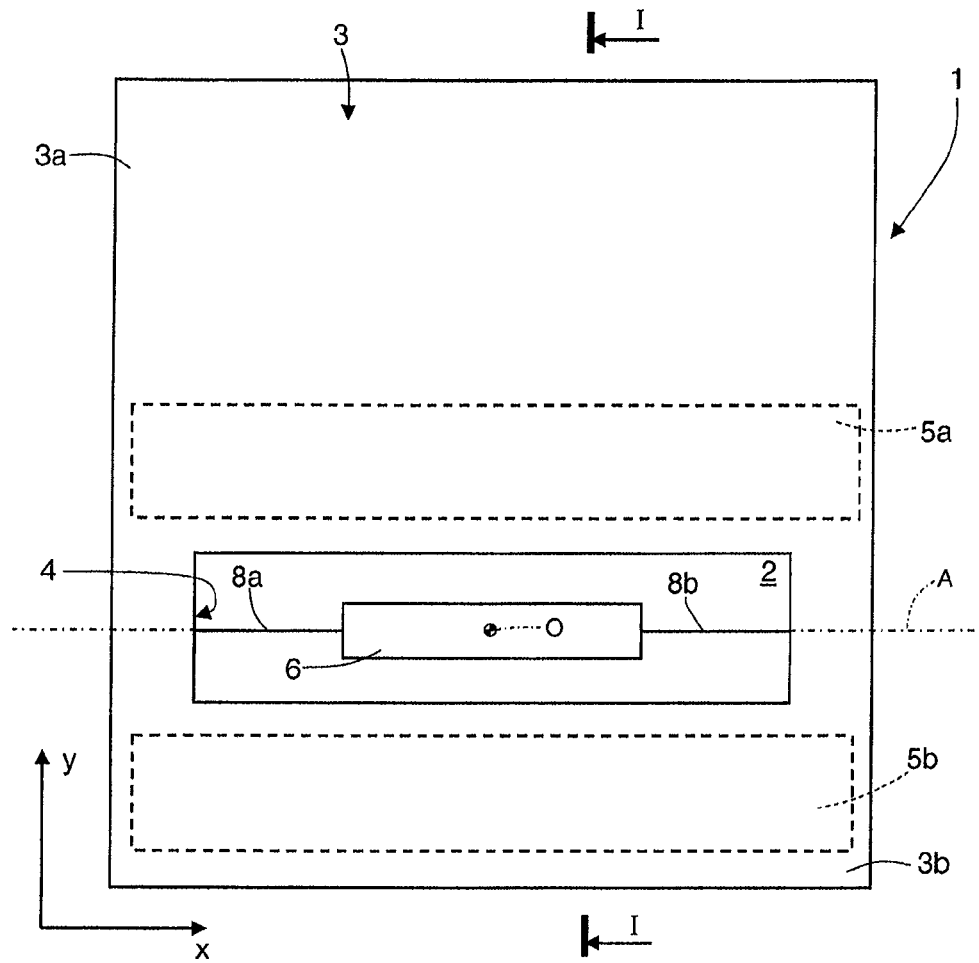
Fig.1a *(Prior Art)*
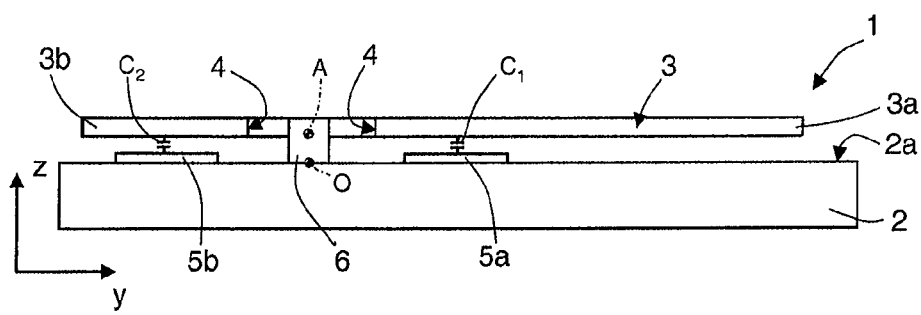
Fig.1b *(Prior Art)*

MICROELECTROMECHANICAL Z-AXIS DETECTION STRUCTURE WITH LOW THERMAL DRIFTS

BACKGROUND

1. Technical Field

The present disclosure relates to a microelectromechanical (MEMS) z-axis detection structure, having low thermal drifts; in particular, the following treatment will make explicit reference, without this implying any loss in generality, to a microelectromechanical z-axis accelerometer.

2. Description of the Related Art

Z-axis inertial accelerometers of a MEMS type are known, including microelectromechanical structures that are sensitive to accelerations acting in a direction orthogonal to a plane of main extension thereof and to the top surface of a corresponding substrate (and that may also be able to detect further accelerations acting in the same plane).

FIGS. 1a and 1b show a MEMS structure of a known type, designated as a whole by the reference number 1, of a z-axis inertial accelerometer, which moreover comprises an electronic read interface (not illustrated), electrically coupled to the MEMS structure.

The MEMS structure 1 comprises a substrate 2 (for instance, made of semiconductor material, in particular silicon) having a top surface 2a, and a sensing mass 3, made of conductive material, for example polysilicon, and set above the substrate 2, suspended at a certain distance from its top surface 2a. The sensing mass 3 has a main extension in a sensor plane xy, defined by a first axis x and by a second axis y orthogonal to one another, and substantially parallel to the top surface 2a of the substrate 2 (in the condition of rest, i.e., in the absence of accelerations or any external stresses acting on the MEMS structure 1), and a substantially negligible dimension along an orthogonal axis z, which is perpendicular to the aforesaid sensor plane xy (and to the aforesaid top surface 2a of the substrate 2) and forms with the first and second axes x, y a set of cartesian axes xyz.

The sensing mass 3 has a through opening 4, which traverses it throughout its thickness, has in plan view a substantially rectangular shape extending in length along the first axis x, and is set at a certain distance from the centroid (or center of gravity) of the sensing mass 3; the through opening 4 consequently divides the sensing mass 3 into a first portion 3a and a second portion 3b, set on opposite sides with respect to the same through opening along the second axis y, the first portion 3a having a larger dimension along the second axis y as compared to the second portion 3b.

The MEMS structure 1 further comprises a first fixed electrode 5a and a second fixed electrode 5b, which are made of conductive material, and are set on the top surface 2a of the substrate 2, on opposite sides with respect to the through opening 4 along the second axis y, so as to be positioned, respectively, underneath the first and second portions 3a, 3b of the sensing mass 3. The first and second fixed electrodes 5a, 5b have, in a plane parallel to the plane of the sensor xy, a substantially rectangular shape, elongated in the first direction x. The first and second fixed electrodes 5a, 5b hence define, together with the sensing mass 3, a first detection capacitor and a second detection capacitor with plane and parallel faces, designated by $C_1$, $C_2$, which have a given rest capacitance.

The sensing mass 3 is anchored to the substrate 2 by means of a central anchoring element 6, constituted by a pillar element extending within the through opening 4 starting from the top surface 2a of the substrate 2, centrally with respect to the same through opening 4. The central anchoring element 6 is consequently set equidistant from the fixed electrodes 5a, 5b along the second axis y, in a position corresponding to the center of gravity (or center of mass), designated by O, of the assembly formed by the fixed electrodes 5a, 5b. The center of gravity O is also used as the origin for the cartesian reference system xyz and corresponds to the single point of constraint of the sensing mass 3 to the substrate 2.

In particular, the sensing mass 3 is connected mechanically to the central anchoring element 6 by means of a first connection elastic element 8a and a second connection elastic element 8b, which extend within the through opening 4, with substantially rectilinear extension, aligned along an axis of rotation A parallel to the first axis x, on opposite sides with respect to the central anchoring element 6 and the center of gravity O. The connection elastic elements 8a, 8b are configured so as to be compliant to a torsion about their direction of extension, thus enabling rotation of the sensing mass 3 out of the sensor plane xy, about the axis of rotation A defined by the same connection elastic elements 8a, 8b. It is to be noted that the axis of rotation A passes through the center of gravity O and moreover constitutes an axis of symmetry for the central anchoring element 6 and the assembly of the fixed electrodes 5a, 5b.

In use, in the presence of an acceleration acting in the orthogonal direction z, the sensing mass 3 turns, by the inertial effect, about the axis of rotation A, so as to approach one of the two fixed electrodes 5a, 5b (for instance, the first fixed electrode 5a) and to correspondingly move away from the other of the two fixed electrodes 5a, 5b (for example, from the second fixed electrode 5b), generating opposite capacitive variations of the detection capacitors $C_1$, $C_2$. A suitable interface electronics (not illustrated in FIGS. 1a, 1b) of the accelerometer, electrically coupled to the MEMS structure 1, receives at input the capacitive variations of the detection capacitors $C_1$, $C_2$, and processes them in a differential way so as to determine the value of the acceleration acting along the orthogonal axis z.

BRIEF SUMMARY

One embodiment is a microelectromechanical structure sensitive along the orthogonal axis z, having low temperature drifts in its electrical characteristics, in particular with respect to offset and sensitivity.

One embodiment is MEMS detection structure that includes:

a substrate having a top surface;

a first fixed-electrode arrangement on the top surface of the substrate;

a sensing mass extending in a plane and suspended above the substrate and the first fixed-electrode arrangement at a separation distance;

connection elastic elements configured to support the sensing mass;

a coupling mass suspended above the substrate and connected to the sensing mass via the connection elastic elements; and an anchoring arrangement configured to anchor the coupling mass to the substrate.

The connection elastic elements are also configured to allow the sensing mass to rotate out of the plane about an axis of rotation and modify the separation distance as a function of a quantity to be detected along an orthogonal axis orthogonal to the plane. The anchoring arrangement is connected to the substrate at a first point of constraint set at a distance from the axis of rotation and in a position corresponding to the first fixed-electrode arrangement.

BRIEF DESCRIPTION OF THE SEVERAL VIEWS OF THE DRAWINGS

For a better understanding of the present disclosure, a preferred embodiment thereof is now described, purely by way of non-limiting example and with reference to the attached drawings, wherein:

FIG. 1a is a plan view of a MEMS structure of a z-axis sensor, of a known type;

FIG. 1b is a cross-sectional view of the MEMS structure of FIG. 1a, taken along the line I-I of FIG. 1a;

FIG. 2b shows schematically the result of the quadratic deformation of the substrate of the MEMS structure of FIG. 1a;

FIG. 3 shows schematically the result of a cubic deformation of the substrate of the MEMS structure of FIG. 1a;

FIG. 10b is a cross-sectional view of the MEMS structure of FIG. 10a, taken along the line X-X of FIG. 10a.

DETAILED DESCRIPTION

Figure 2A:
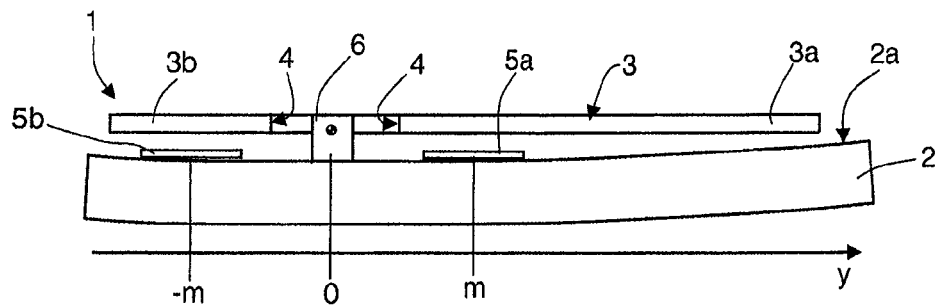
FIG. 2a is a cross-sectional view similar to that of FIG. 1b, in the presence of a quadratic deformation of the substrate of the MEMS structure.

The present applicant has found that the MEMS structure 1 previously described, albeit advantageously enabling detection of accelerations acting along the orthogonal axis z, can be subject to measurement errors whenever the substrate 2 undergoes deformations, for instance as the temperature varies. In a known way, the package of a microelectromechanical sensor is in fact subject to deformations as the temperature varies owing to the different coefficients of thermal expansion of the materials of which is made, causing corresponding deformations of the substrate of the MEMS structure contained therein. Similar deformations may moreover occur on account of particular stresses induced from the outside, for example when the package is soldered on a printed circuit board. Due to the deformations of the substrate 2, the fixed electrodes 5a, 5b, directly constrained thereto (these electrodes are in general deposited on the top surface 2a of the substrate 2), follow these deformations, whilst the sensing mass 3 is displaced following the possible deformations of the central anchoring element 6, remaining, however, perfectly plane.

The present applicant has found, in particular, that the deformations of the substrate 2 can cause both an offset drift and a sensitivity drift in detection of the accelerations directed along the orthogonal axis z.

Figure 2B:
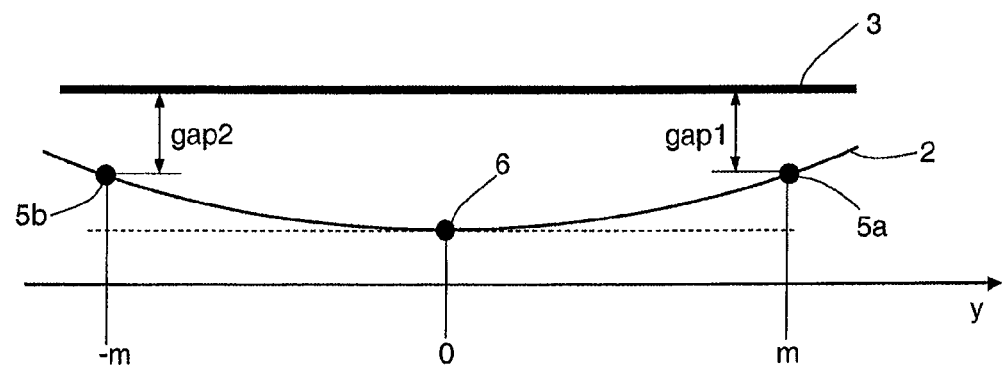

In detail, if the substrate 2, and the corresponding top surface 2a, undergo a quadratic deformation along the orthogonal axis z with respect to the second axis y (centered at the center of gravity O, corresponding to the center of the central anchoring element 6), as illustrated schematically in FIGS. 2a and 2b, due to the deformation equal variations occur of the mean distances (or gaps) $gap_1$, $gap_2$, which separate the sensing mass 3 from the substrate 2 at the first and second fixed electrodes 5a, 5b. In FIG. 2b, the fixed electrodes 5a, 5b are represented ideally as pointlike elements set in positions corresponding to their median point along the second axis y, at a distance m from the center of gravity O; the central anchoring element 6 is also represented ideally by a point located in the center of gravity O.

In this case, the sensor undergoes a sensitivity drift due to the variation of the rest capacitance value of the detection capacitors $C_1$, $C_2$; an offset drift may also occur when an initial difference of the two gaps (and of the associated rest capacitance) is already present, for instance on account of a non-perfect planarity of the substrate 2, or of a non-perfectly parallel arrangement of the sensing mass 3 with respect to the substrate 2.

Figure 3:
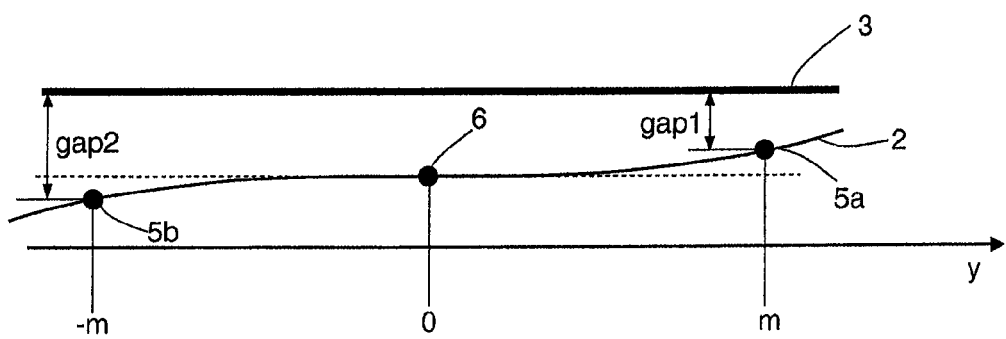

When the substrate 2 undergoes, instead, a cubic deformation along the orthogonal axis z with respect to the second axis y (centered once again at the center of gravity O), as illustrated in FIG. 3 (similar to the aforesaid FIG. 2b), variations of opposite sign occur in the mean distances, $gap_1$, $gap_2$, that separate the sensing mass 3 from the first and second fixed electrodes 5a, 5b (and in the capacitance of the corresponding first and second detection capacitors $C_1$, $C_2$). These variations cause a modification of the electrical signal at output from the interface electronics of the sensor, and thus a variation of the offset of the sensor as a function of the temperature change.

As will be clarified in detail in what follows, one aspect of the present disclosure envisages a suitable modification of the configuration of mechanical coupling (for anchorage and support) of the sensing mass to the substrate of the MEMS structure so that: the sensing mass will undergo displacements substantially corresponding to those undergone by the fixed electrodes, following upon the deformations of the substrate as the temperature varies, and consequently variations of the mean gaps (and of the associated capacitance values) between the sensing mass and the fixed electrodes do not occur (or are very low). In this way, it is possible to eliminate (or markedly reduce) any thermal drift of the sensor and the associated measurement errors, even in the presence of deformations of the substrate. In particular, the sensing mass is coupled to the substrate via points of constraint located in positions corresponding to the fixed electrodes, in such a way as to undergo, in the position of these points of constraint, displacements (in the orthogonal direction z) substantially corresponding to the displacements of the fixed electrodes, as a function of the deformations of the substrate.

Figure 4:
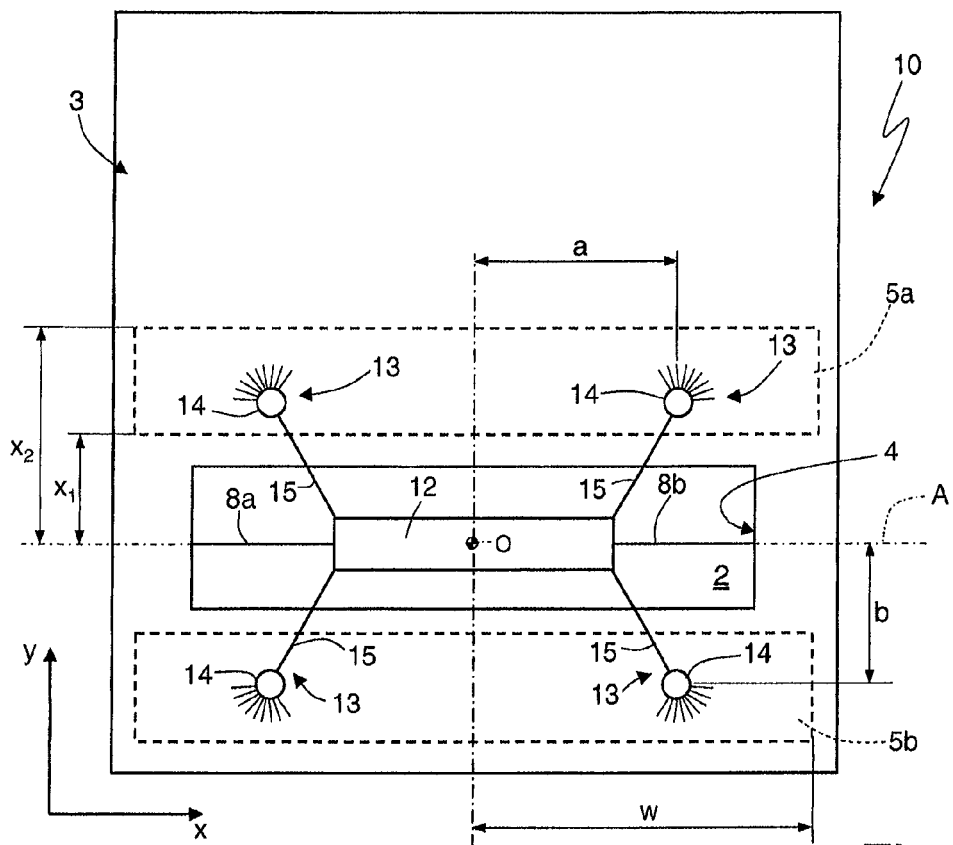
FIG. 4 is a schematic plan view of a MEMS structure of a z-axis sensor, according to an aspect of the present disclosure.

In greater detail, and with reference first to the schematic representation of FIG. 4 (in which elements similar to others already described are designated by the same reference numbers and are not described again), a MEMS structure, designated by 10, of a z-axis sensor (in particular an accelerometer), differs from the structure described with reference to FIGS. 1a and 1b substantially for a different configuration of the structure of mechanical coupling of the sensing mass 3 to the substrate 2, designed to provide the anchorage of the sensing mass 3 and its suspension above the substrate 2.

In particular, the mechanical coupling structure comprises in this case a coupling mass 12, which is set within the through opening 4 at the axis of rotation A and is connected to the sensing mass 3 via the connection elastic elements 8a, 8b (which have torsional characteristics same as the ones previously described). The coupling mass 12 is configured so as to have a high stiffness (in particular, the stiffness value is such as to enable the coupling mass 12 to be considered planar even in the presence of the maximum tolerable deformations of the substrate 2), to the point that it can be considered plane (extending, at rest, in the plane of the sensor xy) and undeformable. The coupling mass 12 has, for example, a substantially rectangular shape in plan view, with principal extension along the first axis x. The coupling mass 12 is, for instance, formed via chemical etching of the same layer of material (for example, polysilicon), during the same process step through which the sensing mass 3 is formed.

The coupling mass 12 is constrained to the substrate 2 in a plurality of points of constraint 13, set in positions corresponding to the fixed electrodes 5a, 5b, in particular within a bulk, or envelope region, of the fixed electrodes with respect to the plane of the sensor xy.

In general, at least one point of constraint 13 is provided for each envelope region associated with the fixed electrodes 5a, 5b. In the example illustrated in FIG. 4, there are, for instance, envisaged four points of constraint 13, two of which set in a position corresponding to the first fixed electrode 5a (in particular, as will be described in detail hereinafter, at respective end portions with respect to the first axis x), and the other two set in positions corresponding to the second fixed electrode 5b (once again, as will be described in detail hereinafter, at respective end portions with respect to the first axis x). The position of each point of constraint 13 is defined by a value a of the coordinate along the first axis x and by a value b of the coordinate along the second axis y; in the same FIG. 4, w designates the half-length of the fixed electrodes 5a, 5b, measured along the first axis x, and $x_1$ and $x_2$ designate, respectively, the minimum value and the maximum value of the coordinate along the second axis y of the envelope region associated to the fixed electrodes 5a, 5b.

Each point of constraint 13 is defined by a respective anchoring element 14 (illustrated schematically in FIG. 4), set in contact with and on top of the substrate 2, and by a respective supporting elastic element 15 (which is also illustrated schematically in FIG. 4), designed to connect the coupling mass 12 mechanically to the respective anchoring element 14.

In particular, each supporting elastic element 15 is configured, together with the respective anchoring element 14 so as to define a hinge element at the respective point of constraint 13, which is insensitive to rotations of the substrate 2 about the point of constraint 13, whereas, instead, it follows its translations rigidly in all directions (and in particular along the orthogonal axis z, any translations along the axes x and y having substantially no effect on the behavior of the sensor).

In addition, the supporting elastic elements 15 have a stiffness much higher than that of the connection elastic elements 8a, 8b, so that it may be considered that the coupling mass 12 will remain substantially still, with respect to the sensing mass 3, in regard to the external accelerations that are to be detected along the orthogonal axis z.

It follows that the MEMS structure 10 behaves, as regards the external accelerations, in a way altogether similar to what is described with reference to the known structure of FIGS. 1a, 1b, with the sensing mass 3 that rotates about the connection elastic elements 8a, 8b out of the plane of the sensor xy, approaching the substrate 2 upon detection of an acceleration acting along the orthogonal axis z.

In the event of a displacement of the substrate 2 (and of the fixed electrodes 5a, 5b therewith) along the orthogonal axis z, due, for example, to a deformation as the temperature varies, the points of constraint 13 move along the orthogonal axis z, substantially in a manner corresponding to the fixed electrodes 5a, 5b, and similar displacements are transmitted to the coupling mass 12 by the supporting elastic elements 15 (in particular, at the attachment ends of the coupling mass 12 to the supporting elastic elements). Following upon these displacements, the coupling mass 12 is displaced, setting itself in a plane that interpolates (for instance, according to the least-squares criterion) the new positions assumed by the points of constraint 13. In particular, errors between the interpolated plane and the positions of the individual points of constraint 13 are compensated by the deformations of the supporting elastic elements 15, which moreover compensate for possible dilations of the substrate 2. In particular, the hinge elements previously defined follow the possible deformations of the substrate 2 in the plane of the sensor xy, and these movements are absorbed by the supporting elastic elements 15 without them being transmitted to the coupling mass 12 in such a way as to prevent breaking or excessive stress on the same coupling mass 12.

Given a same external acceleration applied on the MEMS structure 10, and due to the stiffness of the supporting elastic elements 15 with respect to the external acceleration, the sensing mass 3 thus follows the displacement of the coupling mass 12 in a direct way, being correspondingly displaced in space, so as to satisfy the equilibrium of forces (and twisting moments) acting on the MEMS structure 10; in other words, the sensing mass 3 is rigidly connected to the coupling mass 12 in following the deformations of the substrate 2 along the orthogonal axis z.

Consequently, also the sensing mass 3 undergoes a displacement substantially corresponding to the displacement of the fixed electrodes 5a, 5b, thus in effect reducing the (mean) variation of the gap between the same sensing mass 3 and the fixed electrodes 5a, 5b. In other words, it is as if the sensing mass 3 were directly constrained to the substrate 2 at the points of constraint 13, undergoing translations along the orthogonal axis z corresponding to the ones undergone by the fixed electrodes 5a, 5b at said points of constraint 13.

Figure 5A:
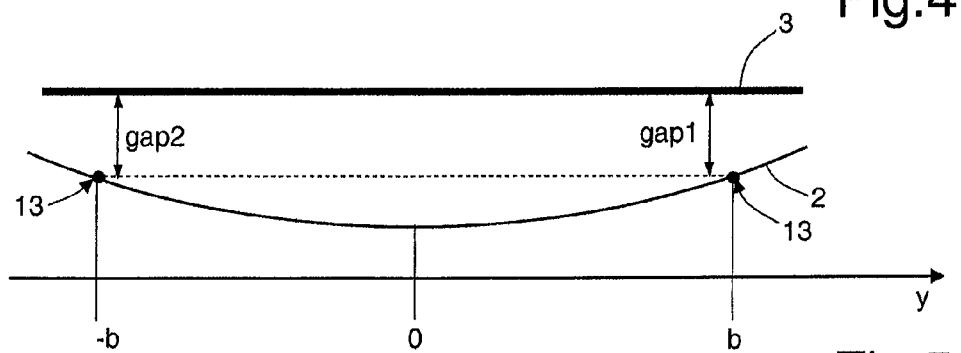
FIGS. 5a, 5b show schematically the result of a quadratic deformation of the substrate of the MEMS structure of FIG. 4.

As illustrated schematically in FIG. 5a, when a quadratic deformation of the substrate 2 occurs, the distances $gap_1$, $gap_2$ between the sensing mass 3 and the substrate 2 do not undergo in this case variations with respect to the case at rest, at the points of constraint 13. Intuitively, it is moreover possible to determine, as will be described in detail hereinafter, the value b of the coordinate of the points of constraint 13 along the second axis y, such that the quadratic deformation does not produce an appreciable variation of the mean values of the distances between the sensing mass 13 and the fixed electrodes 5a, 5b (considered in their entire extension along the second axis y), with the result that there do not occur appreciable changes in the values of sensitivity and offset at output from the sensor.

Figure 5B:
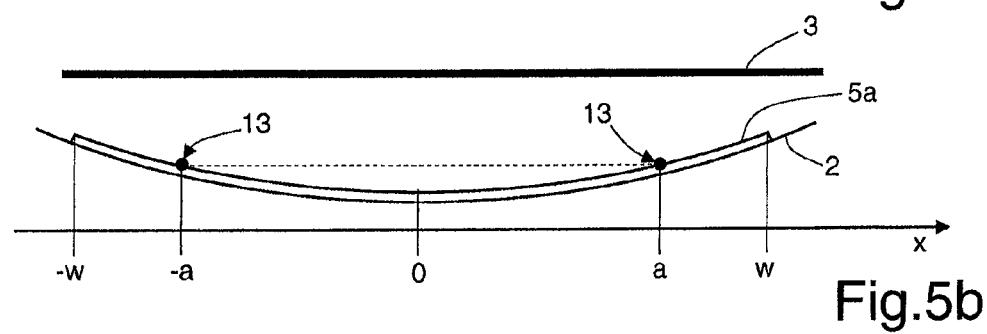

Likewise, as illustrated in FIG. 5b, it is intuitively possible to determine an appropriate value a for the coordinate along the first axis x of the position of the points of constraint 13 such that the mean value of the distances $gap_1$, $gap_2$ between the sensing mass 3 and the fixed electrodes 5a, 5b (along their entire length w) will remain substantially constant as the temperature varies, with respect to the case at rest.

Figure 6:
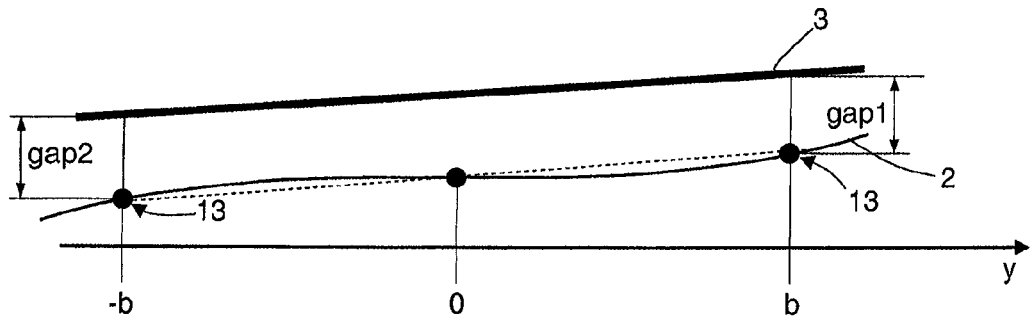
FIG. 6 shows schematically the result of a cubic deformation of the substrate of the MEMS structure of FIG. 4.

Also in the case of a cubic deformation, as illustrated in FIG. 6, a variation does not occur of the distances $gap_1$, $gap_2$ between the sensing mass 3 and the substrate 2, at the coordinates of the points of constraint 13 (the plane of the sensing mass 3 is inclined in fact following the displacement in an opposite direction of the points of constraint located on the opposite side with respect to the center of gravity O). Intuitively, it is once again possible to determine the optimal position of the points of constraint 13 such as to minimize the variation of the mean values of the distances between the sensing mass 3 and the fixed electrodes 5a, 5b (considered in their entire extension along the second axis y) so that once again the output of the sensor will be insensitive to temperature, both for the sensitivity values and the offset values.

The arrangement of the points of constraint 13 in the proximity of the fixed electrodes 5a, 5b is hence per-se advantageous, in so far as it causes the sensing mass 3 to undergo displacements that can be approximated to the mean displacements of the fixed electrodes 5a, 5b, thus reducing the thermal drift of the electrical values at output from the sensor. In any case, through a mathematical modeling of the MEMS structure 10, the optimal specific position of the points of constraint 13 (and of the corresponding anchoring elements 14) can advantageously be determined such as to effectively minimize the mean variation of the distances $gap_1$, $gap_2$ between the sensing mass 3 and the fixed electrodes 5a, 5b (considered in their entire extension along the first and second axes x, y).

In other words, it is possible to define an iterative procedure for determining, in the stage of design and manufacture of the MEMS structure, the best position of the points of constraint 13 that will enable minimization of the sensitivity and offset drifts of the sensor in the presence of deformation of the substrate 2. Advantageously, this procedure is applicable in a general way to any geometry and configuration of the fixed electrodes 5a, 5b of the MEMS structure 10.

Figure 7:
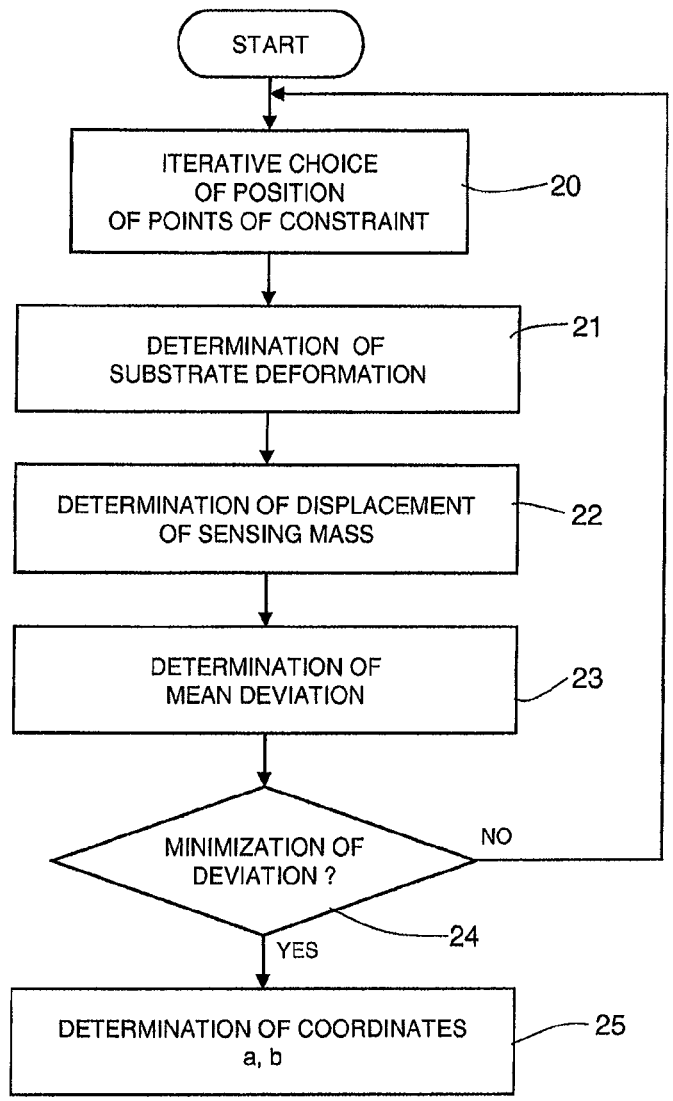
FIG. 7 is a flowchart regarding steps of a procedure for designing the MEMS structure of FIG. 4.

In detail, and as illustrated in FIG. 7, an initial step of the procedure, designated by 20, envisages choosing an initial position of the points of constraint 13, in terms of the values of the coordinates a and b along the first and second axes x, y.

Then (step 21), a deformation $z_{sub}$ of the substrate 2 is determined (i.e., a displacement along the orthogonal axis z as a function of the coordinates along the first and second axes x, y), given by:

$$z_{sub} = c_0 + c_1 \cdot x + c_2 \cdot y + c_3 \cdot x \cdot y + c_4 \cdot x^2 + c_5 \cdot y^2 + c_6 \cdot x^2 \cdot y + c_7 \cdot x \cdot y^2 + c_8 \cdot x^3 + c_9 \cdot y^3 \ldots$$

assuming that the components of an order higher than the third (corresponding to a cubic deformation) are neglected. It is in fact known that in structures having small dimensions (such as precisely MEMS structures) the linear, parabolic, and cubic deformations are the principal deformations for describing the mechanical behavior, whilst the deformations of a higher order can in general be neglected.

Next (step 22), the displacement along the orthogonal axis z and the resulting arrangement of the coupling mass 12 (and hence of the sensing mass 3 rigidly connected thereto, to the point that it can be considered as a single suspended mass) are determined. To obtain a higher degree of precision, FEM (Finite Element Method) simulations can be carried out, dividing (in a per-se known manner) the irregular mechanical structures into an appropriate number of regular portions. The sensing mass 3, assumed as being planar, will hence have a displacement $z_{mass}$ along the orthogonal axis z, given by:

$$z_{mass} = b_0 + b_1 \cdot x + b_2 \cdot y$$

Interpolating with a plane the positions of the points of constraint 13 (x=a; y=b), using the least-squares method, the following expression is obtained for the displacement $z_{mass}$ of the sensing mass 3:

$$z_{mass} = (c_0 + c_4 \cdot a^2 + c_5 \cdot b^2) + (c_1 + c_7 \cdot b^2 + c_8 \cdot a^2) \cdot x + (c_2 + c_6 \cdot a^2 + c_9 \cdot b^2) \cdot y$$

In a subsequent step (step 23) the mean deviation is then determined for each of the fixed electrodes 5a, 5b (in particular for each of the corresponding envelopes), between the deformation of the substrate 2 and the displacement of the sensing mass 3, performing an integration over the entire area of the electrodes (in particular, the corresponding envelope area). The deviation between the deformation of the substrate 2 and the displacement of the sensing mass 3 is given by $$\Delta z = z_{mass} - z_{sub}$$

and the mean deviation S_mean is given by the integral of this deviation with respect to the integration area (the area $\Omega$ of each fixed electrode 5a, 5b):

$$S\_mean = \frac{\int_\Omega \Delta z \cdot d\Omega}{\Omega}$$

In order to determine the optimal values of the parameters a and b it is thus possible to proceed in a numeric and iterative way (step 24) so as to minimize the mean deviation, as formulated above. For this purpose, it is possible to proceed with the iterative setting of new values for the parameters a and b (returning to step 20) and determination of the new mean deviation, until minimization of the aforesaid expression is reached, as indicated in step 25.

In addition, it is possible to proceed (in a manner not illustrated in the figure), with determination of the offset and sensitivity drifts due to the deformation of the substrate 2, using the following expressions:

$$offset = S \cdot ((dist_1 - dist_{1in}) - (dist_2 - dist_{2in}))$$

$$sens = (dist_{1in} + dist_{2in}) / (dist_1 + dist_2),$$

where: S is the sensitivity to acceleration (i.e., the value of acceleration at output with respect to the displacement that has been produced, expressed in m/s²/m); $dist_1$ and $dist_2$ are the mean distances between the first and second fixed electrodes 5a, 5b and the sensing mass 3, in the presence of a deformation of the substrate 2; and $dist_{1in}$ and $dist_{2in}$ are the mean initial distances (or distances at rest) between the substrate 2 and the fixed electrodes 5a, 5b in the absence of deformations of the substrate.

On the basis of the values of offset and sensitivity obtained, it is hence possible to proceed iteratively in choosing of a new position of the anchorages and continue the procedure until determination of the positions of the points of constraint 13 that minimize the offset and sensitivity drifts for any deformation of the substrate 2 is reached.

In the case previously illustrated, with fixed electrodes 5a, 5b of rectangular geometry (in the plane of the sensor xy), and considering first the deformation as a function of the sole coordinates y for determination of the parameter b regarding the optimal position of the points of constraint 13 along the second axis y, the aforesaid expressions are simplified as follows:

$$z_{sub} = c_0 + c_2 \cdot y + c_5 \cdot y^2 + c_9 \cdot y^3$$

$$z_{mass} = (c_0 + c_5 \cdot b^2) + (c_2 + c_9 \cdot b^2) \cdot y$$

$$\Delta z = -c_5 \cdot b^2 - c_9 \cdot b^2 \cdot y + c_5 \cdot y^2 + c_9 \cdot y^3$$

$$S\_mean = \frac{\int_{x_1}^{x_2} \Delta z \cdot dy}{x_2 - x_1}$$

The value of the parameter b is thus obtained by minimizing the aforesaid simplified expression for the mean deviation S_mean.

Figure 8:
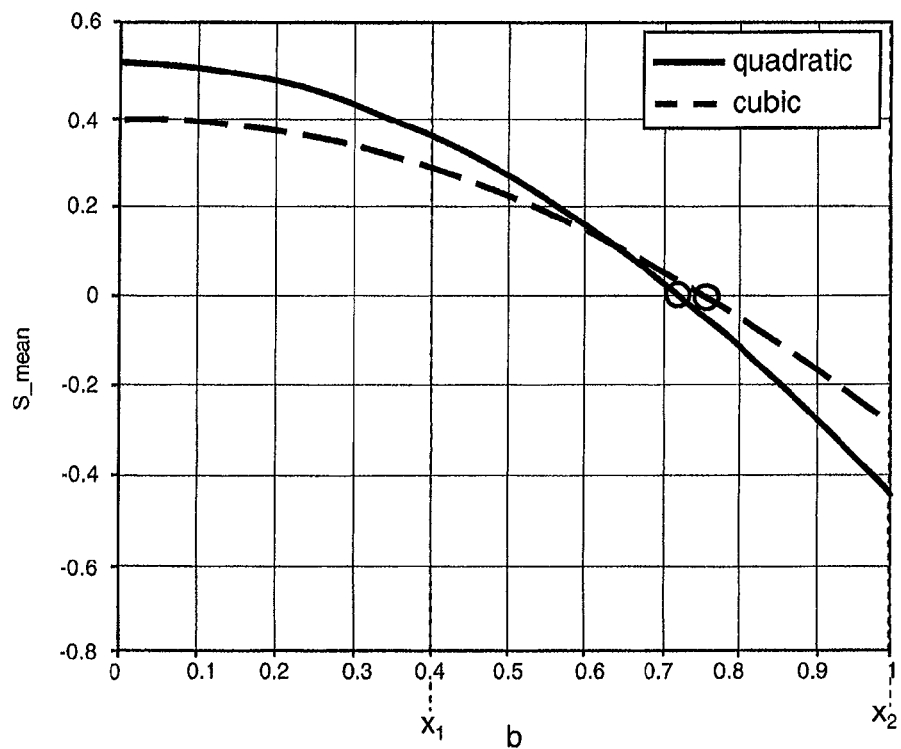
FIGS. 8 and 9 show diagrams of geometrical quantities regarding the design procedure of FIG. 7.

FIG. 8 shows the plot of the mean deviation S_mean as a function of the value of the parameter b (the values of $x_1$ and $x_2$ having been set), in the two cases of cubic deformation (dashed line) and quadratic deformation (solid line), highlighting with a circle the values of the coordinate b for which the mean deviation is null. The two points of optimum are very close, so that during the design stage, a compromise value will be chosen according to the knowledge of the specific deformation of the substrate 2 with temperature (associated to the particular package being used).

In any case, the optimal coordinate b satisfies in this situation the relation:

$$x_1 < b < x_2$$

and in particular, in the case shown, $$x_1 + 0.5 \cdot (x_2 - x_1) < b < x_1 + 0.7 \cdot (x_2 - x_1)$$

the optimal position of the points of constraint 13 thus substantially corresponding to the median point (or centroid) along the second axis y of the envelope region associated to the fixed electrodes 5a, 5b.

Likewise, considering the deformation as a function of the sole coordinate x, for determination of the parameter a regarding the position of the points of constraint 13 along the first axis x, the following simplified expressions are obtained:

$$z_{sub} = c_0 + c_1 \cdot x + c_4 \cdot x^2 + c_8 \cdot x^3$$

$$z_{mass} = (c_0 + c_4 \cdot a^2) + (c_1 + c_8 \cdot a^2) \cdot x$$

$$\Delta z = -c_4 \cdot a^2 - c_8 \cdot a^2 \cdot x + c_4 \cdot x^2 + c_8 \cdot x^3$$

$$S\_mean = \frac{\int_{-w}^{w} \Delta z \cdot dx}{2w}$$

Figure 9:
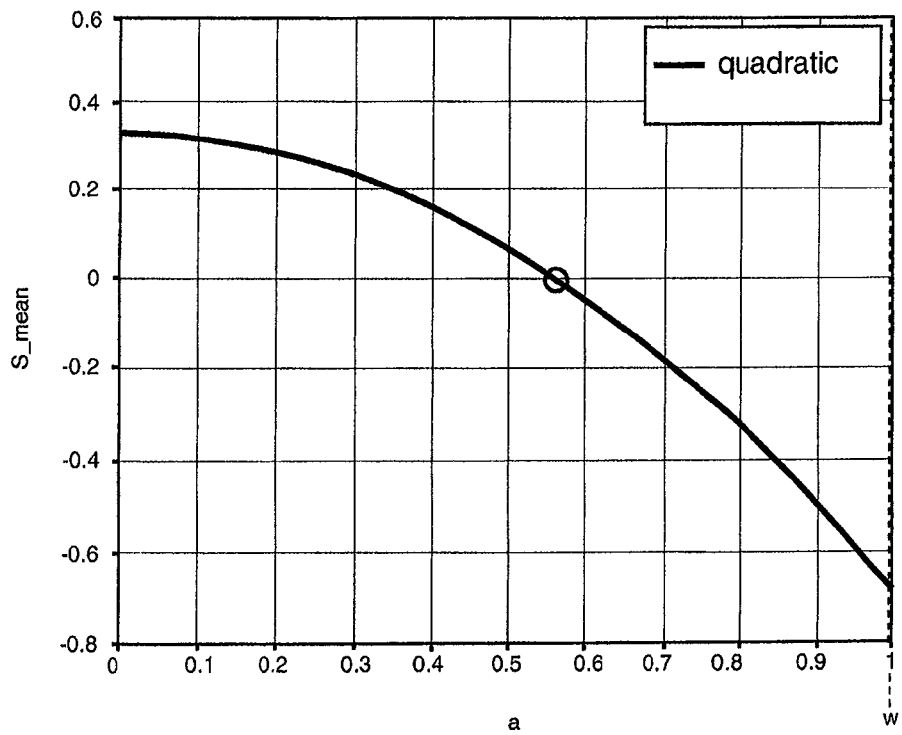

Once again, the value of the coordinate a is obtained by minimizing the aforesaid expression. In this case, the cubic component of the deformation evidently does not yield any contribution, given the symmetrical interval of integration between −w and w. FIG. 9 shows the plot of the mean deviation S_mean as a function of the coordinate a (the value w of the half-length of the fixed electrodes 5a, 5b having been set), in the case of quadratic deformation, where the value of the coordinate a for which the mean deviation is null (point of optimum) is highlighted with a circle. The optimal coordinate a satisfies the relation:

$$0 < a < w$$

and in particular, in the case shown, $$0.5 \cdot w < a < 0.6 \cdot w$$

In particular, it may be shown that the optimal value for the coordinate a (with respect to the value w) is given, in the case illustrated of electrodes having a rectangular geometry, by the expression:

$$a = w / \sqrt{3}$$

Once again, the position of the points of constraint 13 thus substantially corresponds to the median point (or centroid) along the first axis x of each half-portion (considered with respect to the origin O) of the envelope region of the fixed electrodes 5a, 5b.

In the actual implementation of the structure, the arrangement of the anchoring elements 14 and of the supporting elastic elements 15 (which together co-operate to define the points of constraint 13 of the sensing mass 3 with respect to the substrate 2) derives not only from the optimal position of the points of constraint 13 determined in the design stage (as illustrated previously), but also by the technology and the manufacturing process used.

Figure 10A:
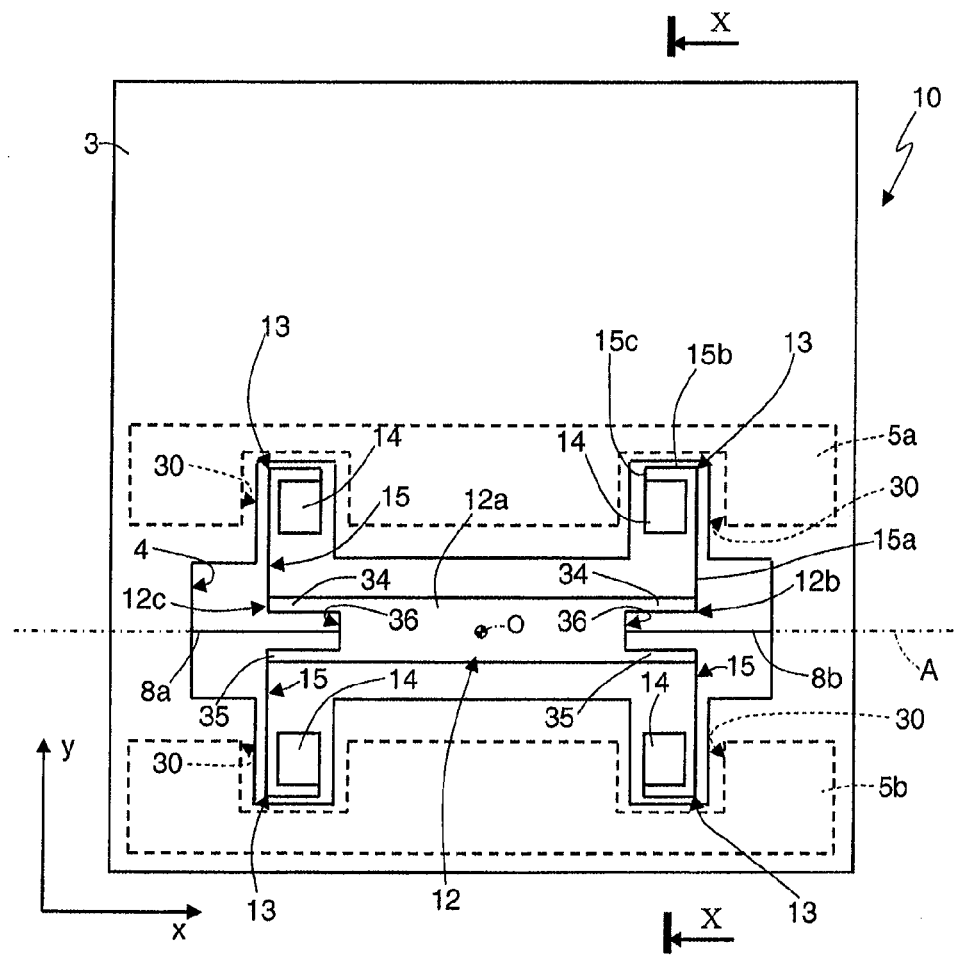
FIG. 10a is a plan view of one embodiment of the MEMS structure of FIG. 4.
Figure 10B:
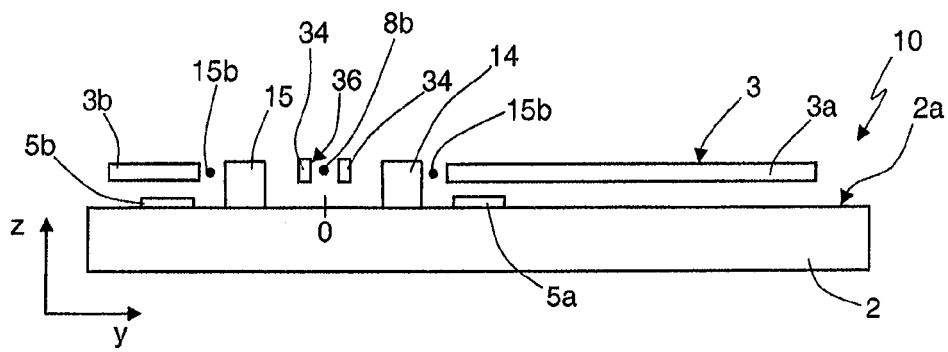

For instance, a possible embodiment of the MEMS structure 10, which takes into account the technological constraints envisaged by the manufacturing process, is illustrated in FIGS. 10a and 10b.

In detail, the anchoring elements 14 are constituted by pillars with a generically square cross section (parallel to the plane of the sensor xy), set in the proximity of a respective fixed electrode 5a, 5b, in particular at least in part within a recess 30 made within the respective fixed electrode 5a, 5b. Consequently, along the edge of each of the fixed electrodes 5a, 5b two recesses 30 are provided, designed to accommodate at least part of a respective anchoring element 14. Similar recesses, corresponding to recesses 30, are provided within the sensing mass 3, opening out towards the through opening 4 and joined thereto.

The supporting elastic elements 15 are here constituted by a first torsional element 15a, extending substantially in a rectilinear manner along the second axis y, alongside (with respect to the first axis x) the respective anchoring element 14, and by a second torsional element 15b, extending substantially in a rectilinear way along the first axis x, alongside (with respect to the second axis y) the anchoring element 14, and having one end in common with the first torsional element 15a. In addition, the first torsional element 15a has a further end connected to the coupling mass 12, and the second torsional element 15b has a further end connected to the respective anchoring element 14 via a connection element 32, which extends orthogonal to the second torsional element along the second axis y.

The first and second torsional elements 15a, 15b have a configuration and mechanical characteristics such as to define, in a position corresponding to the end they have in common, a respective point of constraint 13, having a hinge-like operation (as previously described in detail). In particular, the position of this common end coincides with the position of the point of constraint 13 determined in the design stage, as previously illustrated, in such a way as to minimize the differences between the displacements of the fixed electrodes 5a, 5b and of the sensing mass 13 along the orthogonal axis z, when any deformation of the substrate 2 occurs. In particular, the point of constraint 13 is physically positioned outside the effective outline of the respective fixed electrode 5a, 5b, given the need to provide the respective anchoring element 14 at least partly at the same level (with respect to the orthogonal axis z); in any case, it is clear that the position of the same point of constraint 13 falls within the envelope region of the respective fixed electrode 5a, 5b.

In greater detail, each torsional element 15a, 15b is constituted by a beam of small length, and is configured so as to be free to perform rotations about its own axis (axis x or y, according to the direction of its length extension) and be rigid in regard to other types of rotations/displacements.

The coupling mass 12 has in this embodiment a substantially rectangular geometry in plan view (in the plane of the sensor xy) elongated along the first axis x, and has a body 12a and two ends (along the first axis x) 12b, 12c, which are shaped, respectively, like a "C", and like a "reversed C". In particular, each end 12b, 12c is formed by two prolongation elements 34, 35, which project in cantilever fashion from the body 12a above the substrate 2, and define a cavity 36 between them.

The connection elastic elements 8a, 8b extend inside the cavities 36, for connecting up to the body 12a. The first torsional elements 15a of each supporting elastic element 15 connect instead up to one free end of a respective prolongation element 34, 35.

Thanks to the structural arrangement described, the sensing mass 3, rigidly connected to the coupling mass 12, following upon deformations of the substrate 2, displaces along the orthogonal axis z in a way substantially corresponding to the displacements of the fixed electrodes 5a, 5b at the points of constraint 13 so as to minimize the variations of the relative gap between the same sensing mass and the fixed electrodes. In particular, given the configuration of the anchoring elements 14 and of the supporting elastic elements 15, there are a plurality of points (the points of constraint 13, for example four) for which the displacement along the orthogonal axis z of the sensing mass 3 substantially coincides (except for interpolation errors) with the displacement of the substrate 2 (and hence of the fixed electrodes 5a, 5b) due to its deformation.

The advantages of the microelectromechanical detection structure proposed emerge clearly from the foregoing description.

In any case, it is once again emphasized that the particular embodiment and arrangement of the points of constraint 13 of the sensing mass 3 to the substrate 2 enables detection of the accelerations along the orthogonal axis z to be rendered practically insensitive to the deformations of the substrate (for instance, due to variations of temperature or any external stresses, such as those induced by soldering to a printed circuit board). The offset and sensitivity drifts of the sensor as a function of the deformations of the substrate 2 are in fact markedly reduced (they are substantially eliminated), the thermal drifts being thus minimized.

In addition, the solution described for anchorage and support of the sensing mass 3 with respect to the substrate 2 does not entail any substantial modification as regards the modes of detection of the external accelerations and the general operation of the sensor. Advantageously, the MEMS structure 10 has the same overall dimensions and the same encumbrance as compared to traditional solutions (i.e., ones envisaging a single central anchorage set on the axis of rotation A).

Figure 11:
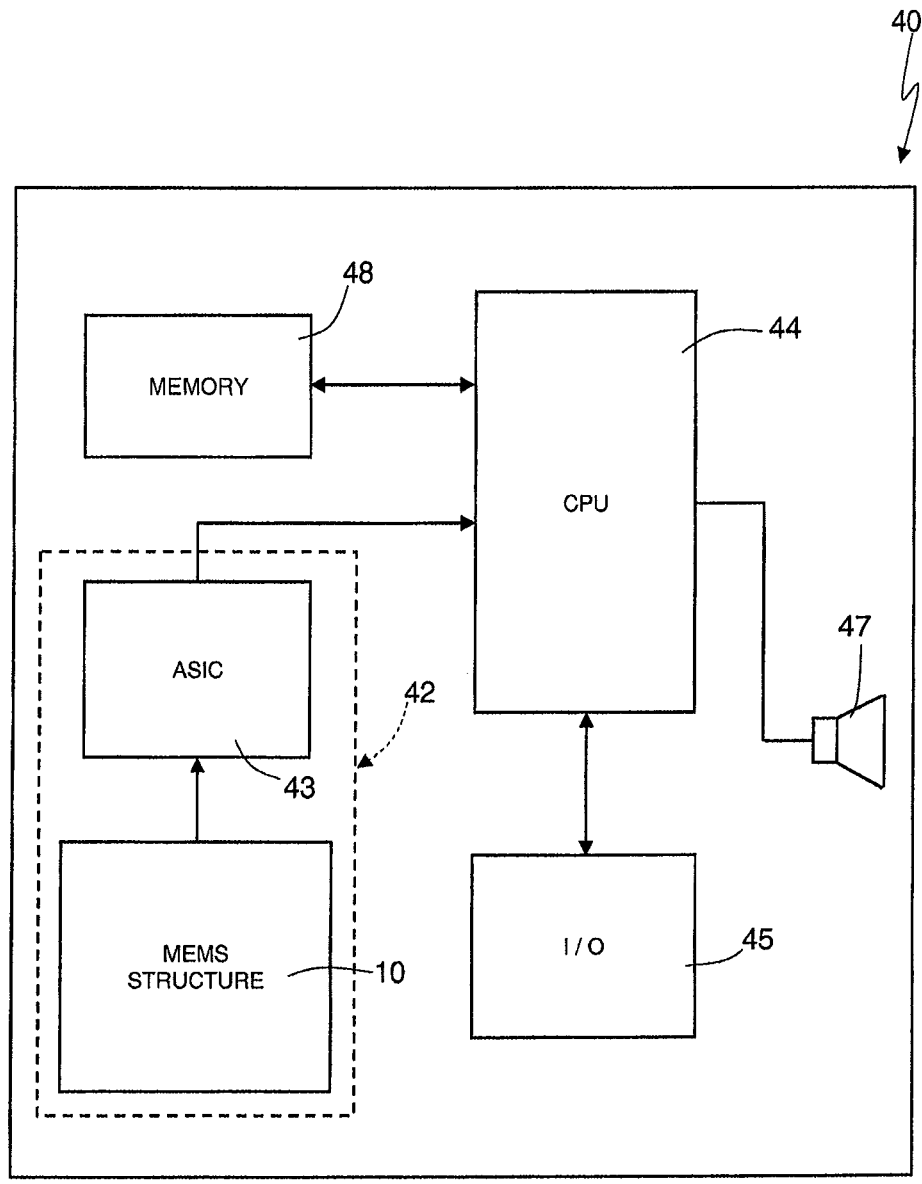
FIG. 11 is a block diagram of an electronic device incorporating the MEMS structure and the corresponding sensor, according to a further embodiment of the present disclosure.

These features thus render the use of the MEMS structure 10 and of the corresponding z-axis acceleration sensor particularly advantageous in an electronic device 40, as illustrated in FIG. 11. In particular, in FIG. 11 a microelectromechanical sensor is designated by 42, which includes the MEMS structure 10 previously described and an ASIC 43, which implements the corresponding reading interface (and can be provided in the same die in which the MEMS structure 10 is provided or in a different die, which can in any case be housed in a same package).

The electronic device 40 is preferably a portable mobile communications device, such as for example a mobile phone, a PDA (Personal Digital Assistant), a portable computer, but also a digital audio player with voice-recording capacity, a photographic camera or video camera, a controller for videogames, etc., the electronic device 40 being generally able to process, store and/or transmit and receive signals and information.

The electronic device 40 comprises a microprocessor 44, which receives the acceleration signals detected by the microelectromechanical sensor 42, and an input/output interface 45, for instance provided with a keyboard and a display, connected to the microprocessor 44. In addition, the electronic device 40 can include a loudspeaker 47, for generating sounds on an audio output (not illustrated), and an internal memory 48.

Finally, it is clear that modifications and variations may be made to what has been described and illustrated herein, without thereby departing from the scope of the present disclosure.

In particular, it is clear that the number of points of constraint 13 with which the sensing mass 3 is mechanically coupled to the substrate 2 can vary with respect to what has been illustrated; it is indeed possible to use a smaller or larger number of these points of constraint 13. The use of a number of points of constraint of less than four entails a progressive reduction in the capacity of compensation of the deformations of the substrate 2, whilst the use of a larger number of points of constraint, although enabling compensation of deformations of a higher order (deformation of the fourth or fifth, or higher order), in so far as it makes available more degrees of freedom for minimization of the mean distance variation, entails, however, a progressive complication of the MEMS structure. In any case, it is possible, for example, to provide a MEMS structure in which just one point of constraint 13 is present for each envelope (positive and negative with respect to the center of gravity O) of the fixed electrodes 5a, 5b, which is, for instance, set exactly in a position corresponding to the median point of the envelope along the axes x and y.

In addition, some aspects of the MEMS structure 10 may vary, without this entailing substantial modifications to the solution proposed for anchorage and suspension of the sensing mass 3. For example, the number of fixed electrodes may vary with respect to what has been illustrated; a larger number of electrodes may be present (for instance, short-circuited to one another according to appropriate arrangements of fixed electrodes designed to form with the sensing mass 3 as a whole the two detection capacitors $C_1$, $C_2$), or else even just one fixed electrode, in the case where a differential detection scheme is not adopted. In particular, also in the case where a larger number of fixed electrodes is present, the envelope region within which the position of the points of constraint 13 is in any case comprised encloses, on both sides of the axis of rotation A, the entire area on which the same electrodes are provided, the entire arrangement of the fixed electrodes being in this case considered globally for determination of the envelope region. Moreover, the shape of the fixed electrodes could vary with respect to what has been illustrated, the envelope region (with respect to the plane of the sensor xy) being generally comprised between the minimum and maximum coordinates, along the axes x and y, of the outline of the same electrodes.

Finally, it is clear that the solution described can advantageously be applied also in different types of transducers in which detection of a capacitive variation along the orthogonal axis z is required, for example in gyroscopes, microphones, or pressure sensors. It is moreover evident that the solution described applies equivalently to uni-axial sensors or to bi-axial or tri-axial sensors that are able to detect accelerations also along the first axis x and/or the second axis y (these sensors being equipped for the purpose with further mobile and fixed electrodes, made and arranged in a per-se known manner).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS structure, comprising:
a substrate having a top surface;
a first fixed-electrode arrangement on the top surface of the substrate;
a mobile mass extending in a plane and suspended above said substrate and said first fixed-electrode arrangement by a separation distance from said first fixed-electrode arrangement;
connection elastic elements configured to support said mobile mass and allow the mobile mass to move out of said plane and modify said separation distance;
a coupling mass suspended above said substrate and connected to said mobile mass via said connection elastic elements; and
an anchoring arrangement configured to couple said coupling mass to said substrate, the anchoring arrangement being coupled to said substrate at a first point of constraint and in a position corresponding to said first fixed-electrode arrangement, wherein said anchoring arrangement includes a first anchoring element rigidly coupled to said substrate at the first point of constraint, and a first supporting elastic element coupling said coupling mass to said first anchoring element.

2. The structure according to claim 1, wherein said first point of constraint is set within an envelope region of said first fixed-electrode arrangement, with respect to said plane.

3. The structure according to claim 2, wherein said anchoring arrangement is configured to maintain said coupling mass substantially still, and to generate a displacement of said coupling mass transverse to the plane in response to a displacement of said substrate transverse to the plane at said first point of constraint; and wherein said connection elastic elements are configured to generate a displacement of said mobile mass in response to the displacement of said coupling mass.

4. The structure according to claim 3, wherein said first anchoring element and first supporting elastic element are configured to define a hinge element at said first point of constraint.

5. The structure according to claim 1, wherein:
said plane is defined by a first axis and by a second axis, which are mutually orthogonal;
said first point of constraint is set within an envelope region of said first fixed-electrode arrangement, with respect to said plane; and
the position of said first point of constraint substantially corresponds to a median point of said envelope region, along one of said first and second axes.

6. The structure according to claim 1, wherein said anchoring arrangement includes further points of constraint configured to anchor said coupling mass to said substrate and generate displacements of said coupling mass transverse to the plane in response to displacements of said substrate transverse to the plane.

7. The structure according to claim 1, wherein said first point of constraint is positioned to reduce a mean deviation between the displacement of said mobile mass and the displacement of said substrate transverse to the plane in a region surrounding said first point of constraint, following upon a deformation of said substrate.

8. The structure according to claim 7, wherein said first point of constraint is positioned to minimize said mean deviation.

9. The structure according to claim 1, wherein said first supporting elastic element has, with respect to said connection elastic elements, a greater stiffness.

10. The structure according to claim 1, wherein said anchoring element is at least in part set within an envelope region of said first fixed-electrode arrangement with respect to said plane.

11. The structure according to claim 1, wherein:
said plane is defined by a first axis and by a second axis, which are mutually orthogonal; and
said supporting elastic element comprises a first torsional spring having a rectilinear extension along said second axis and being connected to said coupling mass, and a second torsional spring having a rectilinear extension along said first axis and being connected to said anchoring element; said first torsional spring and said second torsional spring having one end in common, in a position that defines said first point of constraint.

12. The structure according to claim 1, wherein said mobile mass has a through opening, and said coupling mass and said anchoring arrangement are set within said through opening; and wherein said connection elastic elements extend within said through opening and are aligned to define an axis of rotation of said mobile mass.

13. The structure according to claim 1, further comprising a second fixed-electrode arrangement set on said substrate on an opposite side of said first fixed-electrode arrangement with respect to an axis of rotation of said mobile mass; said mobile mass being set above said substrate in such a way as to form a first detection capacitor and a second detection capacitor respectively with said first fixed-electrode arrangement and said second fixed-electrode arrangement, the detection capacitors having respective capacitance values that vary in a differential way as a function of a quantity to be detected.

14. A microelectromechanical device, comprising:
an interface circuit; and
a MEMS structure electrically coupled to the interface circuit and including:
a substrate having a top surface;
a first fixed-electrode arrangement on the top surface of the substrate;
a mobile mass extending in a plane and suspended above said substrate and said first fixed-electrode arrangement at a separation distance from said first fixed-electrode arrangement;
connection elastic elements configured to support said mobile mass and allow the mobile mass to move out of said plane and modify said separation distance;
a coupling mass suspended above said substrate and connected to said mobile mass via said connection elastic elements; and
an anchoring arrangement configured to couple said coupling mass to said substrate, the anchoring arrangement being coupled to said substrate at a first point of constraint and in a position corresponding to said first fixed-electrode arrangement, wherein said anchoring arrangement includes a first anchoring element rigidly coupled to said substrate at the first point of constraint, and a first supporting elastic element coupling said coupling mass to said first anchoring element.

15. The device according to claim 14, wherein said MEMS structure and said interface circuit form a z-axis accelerometer configured to detect an acceleration directed along an axis orthogonal to said plane.

16. The device according to claim 14, wherein said anchoring arrangement is configured to maintain said coupling mass substantially still, and to generate a displacement of said coupling mass transverse to the plane in response to a displacement of said substrate transverse to the plane at said first point of constraint; and wherein said connection elastic elements are configured to generate a displacement of said mobile mass in response to the displacement of said coupling mass.

17. An electronic device, comprising:
a microprocessor unit; and
a microelectromechanical device that includes:
   an interface circuit electrically coupled to the microprocessor unit; and
   a MEMS structure electrically coupled to the interface circuit and including:
      a substrate having a top surface;
      a first fixed-electrode arrangement on the top surface of the substrate;
      a mobile mass extending in a plane and suspended above said substrate and said first fixed-electrode arrangement at a separation distance from said first fixed-electrode arrangement;
      connection elastic elements configured to support said mobile mass and allow the mobile mass to move out of said plane and modify said separation distance;
      a coupling mass suspended above said substrate and connected to said mobile mass via said connection elastic elements; and
      an anchoring arrangement configured to anchor said coupling mass to said substrate, the anchoring arrangement being connected to said substrate at a first point of constraint and in a position corresponding to said first fixed-electrode arrangement, wherein said anchoring arrangement includes a first anchoring element rigidly coupled to said substrate at the first point of constraint, and a first supporting elastic element coupling said coupling mass to said first anchoring element.

18. The electronic device according to claim 17, wherein said MEMS structure and said interface circuit form a z-axis accelerometer configured to detect an acceleration directed along an axis orthogonal to said plane.

19. The electronic device according to claim 17, wherein said anchoring arrangement is configured to maintain said coupling mass substantially still, and to generate a displacement of said coupling mass transverse to the plane in response to a displacement of said substrate transverse to the plane at said first point of constraint; and wherein said connection elastic elements are configured to generate a displacement of said mobile mass in response to the displacement of said coupling mass.

20. The electronic device according to claim 17, wherein:
said plane is defined by a first axis and by a second axis, which are mutually orthogonal; and
said supporting elastic element comprises a first torsional spring having a rectilinear extension along said second axis and being connected to said coupling mass, and a second torsional spring having a rectilinear extension along said first axis and being connected to said anchoring element; said first torsional spring and second torsional spring having one end in common, in a position that defines said first point of constraint.

21. The electronic device according to claim 17, wherein said anchoring arrangement includes:
second, third, and fourth anchoring elements rigidly coupled to said substrate at second, third, and fourth points of constraint, respectively; and
second, third, and fourth supporting elastic elements coupling the coupling mass to the second, third, and fourth anchoring elements, respectively.

22. The structure according to claim 1, wherein said anchoring arrangement includes:
second, third, and fourth anchoring elements rigidly coupled to said substrate at second, third, and fourth points of constraint, respectively; and
second, third, and fourth supporting elastic elements coupling the coupling mass to the second, third, and fourth anchoring elements, respectively.

23. The sensor according to claim 14, wherein said anchoring arrangement includes:
second, third, and fourth anchoring elements rigidly coupled to said substrate at second, third, and fourth points of constraint, respectively; and
second, third, and fourth supporting elastic elements coupling the coupling mass to the second, third, and fourth anchoring elements, respectively.

* * * * *